(12) United States Patent
Pitaliya (10) Patent No.: US 9,619,759 B2
(45) Date of Patent: Apr. 11, 2017

(54) METHOD AND SYSTEM FOR MANAGING SPORTS RELATED INFORMATION (75) Inventor: Pankaj Pitaliya, Rajasthan (IN)

(73) Assignee: Infosys Limited, Bangalore (IN)

( * ) Notice: Subject to any disclaimer, the term of this patent is extended or adjusted under 35 U.S.C. 154(b) by 193 days.

(21) Appl. No.: 13/072,425

(22) Filed: Mar. 25, 2011

(65) Prior Publication Data

US 2012/0166449 A1    Jun. 28, 2012

(30) Foreign Application Priority Data

Dec. 28, 2010 (IN) .......................... 3975/CHE/2010

(51) Int. Cl.
*G06F 7/00* (2006.01)
*G06Q 10/00* (2012.01)
*G06F 17/18* (2006.01)

(52) U.S. Cl.
CPC ............. *G06Q 10/00* (2013.01); *G06F 17/18* (2013.01)

(58) Field of Classification Search
None
See application file for complete search history.

(56) References Cited

U.S. PATENT DOCUMENTS

| | | | |
|---|---|---|---|
| 5,683,090 A | | 11/1997 | Zeile et al. |
| 5,815,665 A * | | 9/1998 | Teper et al. ................... 709/229 |
| 6,240,415 B1 | | 5/2001 | Blumberg |
| 6,371,855 B1 * | | 4/2002 | Gavriloff ........................ 463/42 |
| 6,976,031 B1 | | 12/2005 | Toupal et al. |
| 7,153,211 B2 | | 12/2006 | Campaign |
| 8,221,225 B2 * | | 7/2012 | Laut ................................ 463/25 |
| 8,584,174 B1 * | | 11/2013 | Fyock et al. .................... 725/61 |
| 2004/0064352 A1 | | 4/2004 | Gordon et al. |
| 2004/0123162 A1 * | | 6/2004 | Antell ..................... H04L 63/08 726/5 |
| 2004/0162803 A1 | | 8/2004 | Rhoads |
| 2005/0021352 A1 | | 1/2005 | Maierhofer et al. |
| 2006/0252476 A1 * | | 11/2006 | Bahou ............................... 463/4 |
| 2007/0185599 A1 | | 8/2007 | Robinson et al. |
| 2008/0096664 A1 * | | 4/2008 | Baray et al. .................... 463/42 |
| 2008/0104103 A1 * | | 5/2008 | Adams ......................... 707/102 |
| 2008/0147422 A1 | | 6/2008 | Buskirk |
| 2009/0070407 A1 | | 3/2009 | Castle et al. |

FOREIGN PATENT DOCUMENTS

WO    0219206    3/2002

* cited by examiner

*Primary Examiner* — Jau-Shya Meng
(74) *Attorney, Agent, or Firm* — Klarquist Sparkman, LLP (57) ABSTRACT

A system and method for managing sports related information in real-time are provided. The system comprises a user interface module configured to receive data pertaining to one or more sports and sports related persons; a repository module configured to store the collected data; and a sports module configured to process the collected data to generate sports related information using predetermined algorithms, the generated information being stored in the repository module and being accessible via the user interface module. The sports module comprises a registration module configured to register one or more users; a validation module configured to validate information pertaining to users; a player information module configured to provide player information to users; a recommendation module configured to generate recommendations related to one or more players, teams or coaches; and a selection module configured to facilitate selection of at least one of players, teams and coaches.

18 Claims, 5 Drawing Sheets

METHOD AND SYSTEM FOR MANAGING SPORTS RELATED INFORMATION

FIELD OF INVENTION

The present invention is related to the field of sports. More specifically, the present invention is directed towards network based management of sports related information.

BACKGROUND OF THE INVENTION

In the sports industry, various tools are available for managing sports related information. These tools enable various users such as, sports personnel, coaches, administrators, selectors etc., to manage sports related information. The management of sports related information is performed by collecting information related to players, teams, events etc. and thereafter generating reports from the collected information. Examples of reports generated include season sports event schedules, team rosters, team and player statistics, pictures and audiovisual reports, press releases etc. The tools also enable organizing individual information. For example, players can collect pictures and video clips, view personal statistics, check performance in a season and so forth.

The available tools for managing sports related information are designed and developed for managing static data, i.e. the tools are designed for managing discrete sets of data. For example, tools are designed for managing data for a football season, a baseball season and so forth. The above-mentioned tools do not consider real-time and/or cumulative data. Further, the tools for managing sports related information are created for specific sports such as, football, cricket, baseball etc. Also, these tools do not provide flexibility in use, i.e. a tool created for a football league can not be used for a baseball league. In addition, the tools are designed to meet specific requirements such as, football information management, baseball information management and so forth. Accordingly, the designed tools use a proprietary repository for managing sports related information. Moreover, the information available through the available tools is not beneficial for selectors, as these tools do not provide comprehensive information related to performance of players in various sports.

Consequently, there is a need for a method and a system for efficiently managing sports related information. Further, the method should enable real-time management of sports related information. The method should also enable efficient management of sports related information across a plurality of sports.

SUMMARY OF THE INVENTION

A system and computer-implemented method for managing sports related information in real-time are provided.

In various embodiments of the present invention, the system comprises a user interface module in communication with a data processing unit and operative to receive data pertaining to one or more sports and sports related persons. The system further comprises a repository module in communication with a server and operative to store the collected data. The system also comprises a sports module in communication with a server and operative to process the collected data to generate sports related information using predetermined algorithms, the generated information being stored in the repository module and being accessible via the user interface module.

In an embodiment of the present invention, the sports module comprises a registration module configured to register one or more users, the registration being performed by collecting a predetermined set of details.

In an embodiment of the present invention, the sports module comprises a validation module configured to validate information pertaining to users based on one or more business validation strategies.

In an embodiment of the present invention, the sports module comprises a player information module configured to provide player information to users.

In an embodiment of the present invention, the sports module comprises a recommendation module configured to generate recommendations related to one or more players, teams or coaches, the recommendations being generated by calculating scores based on collected data.

In an embodiment of the present invention, the sports module comprises a selection module configured to facilitate selection of at least one of players, teams and coaches by at least one of authorized sports related organizations and authorized users.

In an embodiment of the present invention, the system further comprises a server configured to host an enterprise application for managing sports related information in real-time, the enterprise application being accessible to users via the user interface module over a network.

In an embodiment of the present invention, the registration module is configured to generate a unique identifier and define access rights and privileges for users, wherein the unique identifier is generated after verification of the collected set of details.

In an embodiment of the present invention, the player information module is further configured to provide access to player information to at least one of players, coaches and selectors; and provide statistics of the player. In an embodiment of the present invention, the statistics of the player comprises at least one of player performance information comprising at least one of career information of the player and sports achievement information of the player; information pertaining to one or more competitors of the player; and fitness level details of the player. In an embodiment of the present invention, the fitness level details are generated from a predetermined set of details gathered from at least one authorized user. In an embodiment of the present invention, the information pertaining to the competitors of the player is generated from skill level details of the player, the skill level details being identified from the statistics of players.

In an embodiment of the present invention, the recommendation module generates recommendations by calculating a recommendation score based on the collected details and predetermined algorithms. The recommendation module also generates a merit list based on the calculated recommendation score.

In an embodiment of the present invention, the selection module is further configured to search for at least one of a player, a team and a coach based on search inputs; and return at least one of a list of players, a list of teams and a list of coaches based on the search inputs.

In an embodiment of the present invention, the system comprises a web module in communication with a server and operative to collect and provide at least one feed pertaining to sports related information, the feed being generated by one or more sports related web-pages.

In an embodiment of the present invention, the system comprises a club module in communication with a server and operative to provide access to data pertaining to one or more clubs; endorse sports related persons with the one or more clubs; enable endorsement of the clubs with at least one of authorized sports related organizations and authorized users; and enable sports related persons to get affiliated and registered with the authorized sports related organizations and authorized users.

In an embodiment of the present invention, the system comprises a data record module in communication with a server and operative to collect data from at least one of the user interface module and one or more web-based sources.

In an embodiment of the present invention, the system comprises a web services module in communication with a server and operative to provision one or more predetermined web-based services to authorized users, the predetermined web-based services comprising at least one of web-based services to fetch ratings for sports, the ratings being provided by sports information providers; web-based services for fetching advertisements from one or more advertisers; and web-based services for providing details related to medicine and diet information pertaining to sports. The web services module interacts with web module for provisioning of the web-based services, wherein the web module interacts with web service providers for gathering details pertaining to the web-based services.

In an embodiment of the present invention, the system comprises a virtual play module in communication with a server and operative to provide at least one virtual play option via the user interface module to authorized users. The virtual play option enables users to access player statistics and event rules and define at least one of a virtual player and team for participation in the corresponding event; and allocate reward points based on the performance of the virtual player and team.

In an embodiment of the present invention, the system comprises a workflow module in communication with a server and operative to generate one or more workflows for managing sports related information.

In an embodiment of the present invention, the sports module comprises an event module configured to plan one or more sport events, the planning being performed based on inputs collected from authorized users. The inputs collected from authorized users comprise at least one of event name and schedule; sports being played in the event; and allowable categories. The event module is also configured to define rules for events, the rules being stored in the repository module; and define categories for the created events, wherein the defined categories facilitate at least one of capture and track information related to events; define access rights and privileges for users; associate events with auto-approval provisions; collect details associated with events via web-based services for automatic update of details related to the events; and collect details associated with events via predefined applications.

In various embodiments of the present invention, the method for managing sports related information in real-time comprises prompting, via program instructions executed by a computer system, one or more users to input a predefined set of details. The method further comprises collecting, via program instructions executed by a computer system, data pertaining to one or more sports and sports related persons. In addition, the method comprises processing collected data, via program instructions executed by a computer system, to generate sports related information using predetermined algorithms, the processed information being accessible to authorized users. The processing is performed for at least one of validating the generated information based on one or more business validation strategies; providing player information to users; generating recommendations relating to at least one of a player, a team and a coach; and facilitating selection of at least one of the player, the team and the coach.

In an embodiment of the present invention, the player information comprises statistics for players. The statistics for players comprises at least one of player performance information comprising at least one of career information of the player; and sports achievement information of the player; information pertaining to one or more competitors of the player; and fitness level details of the player, the fitness level details being generated from a predetermined set of details gathered from an authorized user.

In an embodiment of the present invention, generating recommendations further comprises calculating, using program instructions executed by a computer system, a recommendation score based on the collected details and predetermined algorithms.

In an embodiment of the present invention, facilitating selection further comprises searching, via program instructions executed by a computer system, for at least one of a player, a team and a coach based on search inputs; and returning, via program instructions executed by a computer system, at least one of a list of players, a list of teams and a list of coaches based on the search inputs.

In an embodiment of the present invention, the method further comprises the step of registering, via program instructions executed by a computer system, one or more users by collecting a predetermined set of details. Registering the users further comprises generating, via program instructions executed by a computer system, a unique identifier and defining access rights and privileges for users, wherein the unique identifier is generated after verification of the collected set of details.

In an embodiment of the present invention, collecting data further comprises at least one of collecting, via program instructions executed by a computer system, at least one feed pertaining to sports related information, the feed being generated by one or more sports related web-pages; and collecting, via program instructions executed by a computer system, data from one or more web-based sources.

In an embodiment of the present invention, the method further comprises the step of collecting, via program instructions executed by a computer system, updates pertaining to the sports related information, the updates being collected from at least one of authorized users and web-based sources. In addition, the method further comprises the step of updating, via program instructions executed by a computer system, the sports related information by at least one of modifying existing sports related information; and adding information related to recent updates in sports.

In an embodiment of the present invention, the method further comprises providing, via program instructions executed by a computer system, access to data pertaining to one or more clubs; and facilitating, via program instructions executed by a computer system, endorsement of sports related persons with the one or more clubs.

In an embodiment of the present invention, the method further comprises the step of provisioning, via program instructions executed by a computer system, one or more predetermined web-based services to authorized users.

In an embodiment of the present invention, the method further comprises the step of providing, via program instructions executed by a computer system, at least one virtual play option to authorized users. The virtual play option enables users to access player statistics and event rules and accordingly define a virtual player or team to participate in the corresponding event; and allocate reward points based on the success or failure of the virtual player or team.

In various embodiments of the presents invention, a computer program product comprising computer-readable medium having computer-readable program code comprises instructions that, when executed by a computer, cause the computer to prompt one or more users to input a predefined set of details. The computer-readable program code further comprises instructions that, when executed by a computer, cause the computer to collect data pertaining to one or more sports and sports related persons and process collected data to generate sports related information using predetermined algorithms, the processed information being accessible to authorized users, the processing being performed for at least one of: validating the generated information based on one or more business validation strategies, providing player information to users, generating recommendations relating to at least one of a player, a team and a coach and facilitate selection of at least one of the player, the team and the coach.

In an embodiment of the present invention, the computer-readable program code further comprises instructions that, when executed by a computer, cause the computer to calculate recommendation score based on the collected details and predetermined algorithms.

In another embodiment of the present invention, the computer-readable program code further comprises instructions that, when executed by a computer, cause the computer to search for at least one of: a player, a team and a coach based on search inputs and return at least one of a list of players, a list of teams and a list of coaches based on the search inputs.

In an embodiment of the present invention, the computer-readable program code further comprises instructions that, when executed by a computer, cause the computer to: register one or more users by collecting a predetermined set of details.

In another embodiment of the present invention, the computer-readable program code further comprises instructions that, when executed by a computer, cause the computer to collect at least one feed pertaining to sports related information, the feed being generated by one or more sports related web-pages and collect data from one or more web-based sources.

In an embodiment of the present invention, the computer-readable program code further comprises instructions that, when executed by a computer, cause the computer to collect updates pertaining to the sports related information, the updates being collected from at least one of: authorized users and web-based sources.

In another embodiment of the present invention, the computer-readable program code further comprises instructions that, when executed by a computer, cause the computer to provide access to data pertaining to one or more clubs and facilitate endorsement of sports related persons with the one or more clubs.

In an embodiment of the present invention, the computer-readable program code further comprises instructions that, when executed by a computer, cause the computer to provision one or more predetermined web-based services to authorized users.

In another embodiment of the present invention, the computer-readable program code further comprises instructions that, when executed by a computer, cause the computer to provide at least one virtual play option to authorized users, wherein the virtual play option enables users to, access player statistics and event rules and accordingly define a virtual player or team to participate in the corresponding event and allocate reward points based on the success or failure of the virtual player or team.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention provides a system and method for managing sports related information, wherein information related to one or more sports such as, but not limited to, cricket, football, hockey, tennis, archery and so forth is managed. In various embodiments of the present invention, managing sports related information aids various sports organizations in performing operational and management functions. The present invention enables handling of sports related information via a user interface over a network. In various embodiments of the present invention, sports related information is collected and rendered to users via the user interface. The user interface also enables communication of information between users of sports organizations, thereby enabling networking between the users. The user interface further enables users to access various options such as, but not limited to, viewing performance statistics, viewing career information, scheduling events, selecting players/coaches and so forth.

The disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1A:
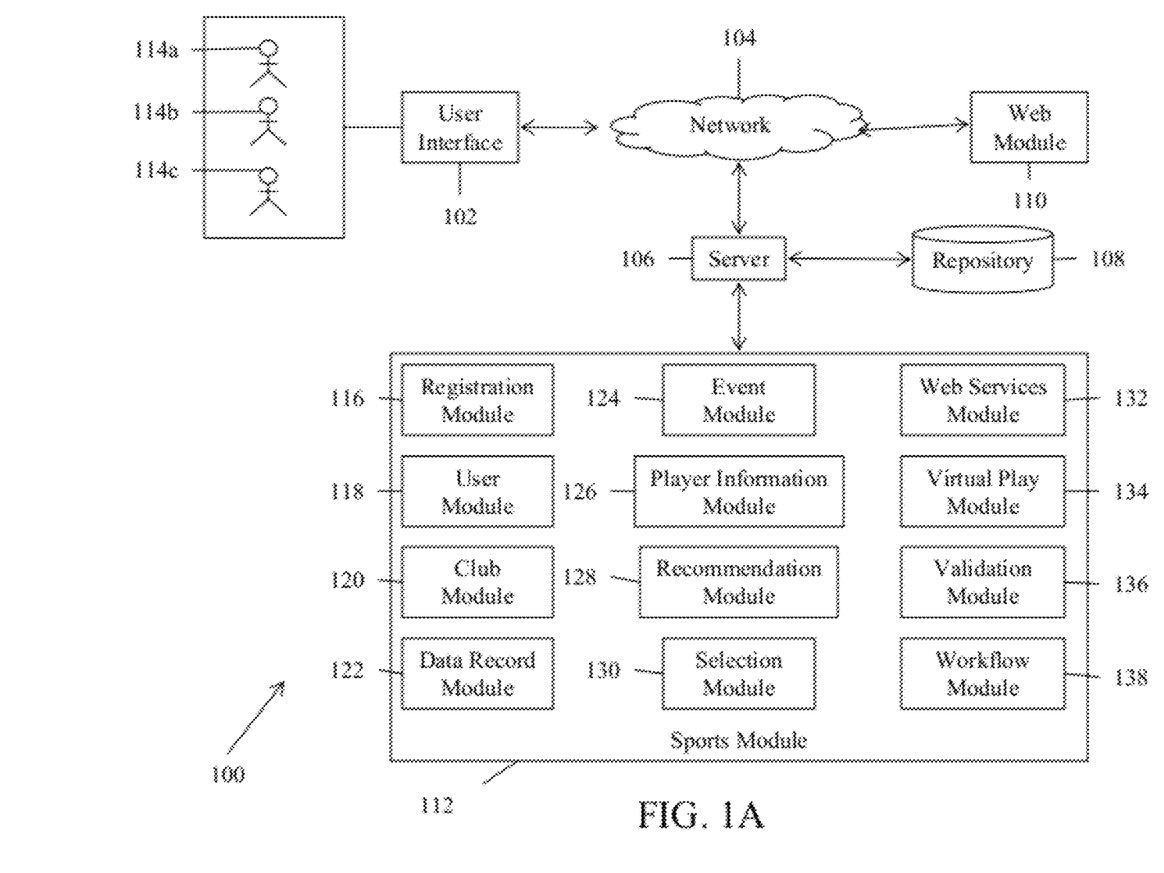
FIG. 1A illustrates a block diagram of a system for managing sports related information, in accordance with an embodiment of the present invention.

FIG. 1A illustrates a block diagram of a system for managing sports related information, in accordance with an embodiment of the present invention.

System 100 includes a user interface 102, a network 104, a server 106, a repository 108, a web module 110 and a sports module 112.

Various users such as, but not limited to, user 114a, 114b and 114c, access system 100 via user interface 102 for managing sports related information. In various embodiments of the present invention, the users are one of, but not limited to, players, team administrators, coaches, referees, selectors, club members, sport organization members, system administrators and fans. In various embodiments of the present invention sports related information includes information pertaining to one or more sports such as, but are not limited to, cricket, football, baseball, basketball, hockey, archery, boxing and tennis. Further, sports related information includes, but is not limited to, information related to the sport such as cricket information, football information etc., information related to players and coaches, statistics related to performance of players/teams/coaches etc., information related to various sports clubs, event information and diet information.

In various embodiments of the present invention, user interface 102 enables collection of data and modification of existing information, thereby enabling management of sports related information. Examples of user interface 102 include audiovisual interfaces such as, but not limited to, websites and mobile accessed sites, accessed using data processing units. Data processing units process captured data encoded in a format recognizable by the data processing unit or data that has been created and stored. Examples of data processing units include, but are not limited to, computers, laptops, personal digital assistants, palmtops and mobile phones.

In an embodiment of the present invention, user interface 102 provides a user login interface to the users. The user login interface can be a generic user login interface that can be accessed by users including, but not limited to, players, team administrators, coaches, referees/umpires, selectors, club members, sports organization members, system administrators and general users. Alternately, separate user login interfaces for separate users can also be provided.

The user login interface includes a login and a password textbox for gathering login and password details of a user. The user login interface also includes a tab for registration of new users. In order to manage sports related information, users need to provide login and password details. Based on the authentication of the login and password details, a corresponding user interface is rendered to the user. In an exemplary embodiment of the present invention, upon successful authentication of a team administrator, an administrator user interface is rendered to a team administrator. In another exemplary embodiment of the present invention, upon successful authentication of a player, a player user interface is rendered to the player.

In an embodiment of the present invention, users are provided access to corresponding user interfaces over network 104. Network 104 is a data communication network such as, but not limited to, Local Area Network (LAN), Wide Area Network (WAN), Metropolitan Area Network, Wireless Data Communication Network, Internet and cellular networks, wherein cellular networks include wireless networks capable of data exchange such as General Packet Radio Service (GPRS), Enhanced Data for Global Evolution (EDGE), High-Speed Packet Access (HSPA), Evolution Data Optimized (EvDO), Long-Term Evolution (LTE), Worldwide Interoperability for Microwave Access (Wi-MAX), Wireless Fidelity (WiFi) and any other type of over the air wireless network.

The management of sports related information is facilitated by server 106. In various embodiments of the present invention, server 106 facilitates communication between the users and system 100 via network 104 through user interface 102. Examples of server 106 include, but are not limited to, Websphere (IBM®), Tomcat (Apache®) and Glassfish (Sue).

In an embodiment of the present invention, server 106 includes a framework for executing a set of procedures such as, programs, routines, scripts and so forth, for facilitating the provisioning of an enterprise application for managing sports related information. In an exemplary embodiment of the present invention, the enterprise application is a web-based portal for managing sports related information. The enterprise application provides the business logic for managing sports related information via system 100. Further, the enterprise application can be accessed via various network protocols such as, but not limited to, WAP and HTTP.

Server 106 also facilitates interaction with repository 108 for management of sports related information. Repository 108 enables storage and retrieval of sports related information. For example, repository 108 enables storage and subsequent retrieval of information related to players and teams provided by coaches. In an exemplary embodiment of the present invention, repository 108 is a database including a set of tables. For example, repository 108 includes a database with tables for storing player information, match information, event information, coach information and so forth. Further, the database is one of, but not limited to, a relational database, operational database, analytical database, external database, navigational database and document oriented database. In various embodiments of the present invention, the information stored in repository 108 is accessed via user interface 102.

In various embodiments of the present invention, repository 108 stores various rules and regulations defined for one or more sports. The defined rules and regulations are accessed prior to storing data pertaining to corresponding sports, thereby preventing conflict in data stored in repository 108.

Server 106 also facilitates interaction with web module 110 via network 104 through user interface 102. Web module 110 enables access of web-based sources of sports related information. Examples of web-based sources include, but are not limited to, sports news/media sources, web-based sports information repositories such as repositories of Olympics, Asiad etc. and web-pages of sports organizations such as International Cricket Council (ICC), The International Federation of Football Association (French: Federation Internationale de Football Association—FIFA) etc. In an embodiment of the present invention, web module 110 enables access of advertisement feeds provided through various sports related web-pages.

The management of sports related information is facilitated by sports module 112. In various embodiments of the present invention, sports module 112 enables management of sports related information by enabling collection of data pertaining to sports, processing collected data to generate sports related information, storing generated sports related information and rendering the stored sports related information via user interface 102 to authorized users upon subsequent access.

Data pertaining to sports includes data related to one or more of, but not limited to, users, sports, sport events, sports organizations and sports related news/media/advertisements. The data related to users includes data about players, coaches, referees/umpires, selectors, sports organization members and so forth. Further, the data related to users includes details such as, but not limited to, name, contact information, career information, sport affiliated with, information about performance in the sport affiliated with and so forth. The data related to sports includes data of various sports such as cricket, football, hockey, athletics, tennis and so forth, records set, top performing players, associated rules and regulations, career development, medicines, diet and so forth. The data related to sports events relates to data collected about various sports events such as Olympics, Asiad etc. Further, the data collected includes event schedule details, participant details, event details and so forth. The data about sports organizations includes details related to various sports organizations such as ICC, FIFA and so forth. The abovementioned description related to data pertaining to sports is for illustrative purposes and the scope of the terminology should not be considered limiting. Accordingly, the terminology is to be accorded the widest scope.

In various embodiments of the present invention, the data pertaining to sports is collected from one or more of, but not limited to, users and web-based sources of sports related information. The collected data is stored in repository 108.

Sports module 112 interacts with repository 108 for collecting and processing data. The processing of collected data to generate sports related information includes one or more of, but not limited to, validating collected data, gathering approvals pertaining to collected data and generating reports from collected data. In an embodiment of the present invention, the processing of collected data is performed via one or more predefined algorithms. Subsequent to the processing of the collected data, the generated sports related information is stored in repository 108.

In various embodiments of the present invention, sports module 112 includes a set of modules for facilitating the management of sports related information. The set of modules include a registration module 116, a user module 118, a club module 120, a data record module 122, an event module 124, a player information module 126, a recommendation module 128, a selection module 130, a web services module 132, a virtual play module 134, a validation module 136 and a workflow module 138.

Registration module 116 enables registration of users with system 100. In an embodiment of the present invention, registration of a user is performed via a registration interface rendered on user interface 102. The registration interface is rendered upon access of a registration tab provided on the user login interface.

Registration of a user includes collection of a predefined set of details relating to the user, validation and verification of the collected details and generation of a unique identifier (UId). The predefined set of details includes, but is not limited to, name of the user, address of the user, photo identification proof of the user, sports achievements and career information of the user.

The validation of the collected details is performed to check consistency in the collected details. If the captured details are consistent, the captured details are forwarded for verification. If the captured details are not consistent, the user is prompted to re-enter the details that are not consistent and the details captured thereafter are validated and forwarded for verification.

The details that are forwarded for verification are stored in repository 108. In an embodiment of the present invention, the verification is performed by a third-party such as, but not limited to, a member of a sports organization, a referee, a government sports organization member and so forth. Subsequent to verification a UId is generated for the user and stored in repository 108. The generated UId is used for identification of the user during subsequent access of system 100. In an embodiment of the present invention, the UId is alphanumeric. In an exemplary embodiment of the present invention, the UId is generated according to the following syntax:

<Owner code (3 character)><state code (2 character)><discipline/sports code (3 characters)><players serial number (5 character alphanumeric)>

An example of the UId generated based on the syntax is IOA RJ JVN 1B645, wherein 1B645 is a player associated with IOA (Indian Olympic Association) from the State of RJ (Rajasthan) in the sport of JVN (Javelin). The generated UId is forwarded to the user via one of, a letter, an electronic mail, a Short Message Service (SMS) and so forth.

Registration module 116 also enables collection of initial data pertaining to users. Initial data pertaining to users includes, but is not limited to, career information, sports achievements, clubs associated with and so forth.

Access rights and privileges for various registered users may be defined via registration module 116. In an embodiment of the present invention, the access rights and privileges are provided based on categories of users. For example, access rights and privileges provided to players enable them to view personal statistics, team statistics, possible competitors, diet tips and so forth and restrict them from viewing confidential information available to administrators, referees, coaches and so forth.

In an embodiment of the present invention, registration module 116 enables provisioning of auto-approvals that enable collection of data pertaining to participation of users in one or more sports from web-based sources. In an exemplary embodiment of the present invention, the data is collected using one or more web services, which enables automatic update of data pertaining to the users. The collection of data may also be performed via predefined applications provided by sports organizations for one or more events such as Olympics, Asiad etc.

Users after registering via registration module 116 can access system 100 for managing sports related information. User module 118 enables access of system 100 to one or more users via user interface 102. The access to system 100 is enabled after authentication of users, wherein the authentication of users is performed based on the login and password details provided by the corresponding users via user interface 102. Further, the interface rendered to each user is based on the UId of the corresponding user. For example, subsequent to authentication of a player based on the login and password details, the player is provided with an interface based on the UId generated for the player that enables the player to access sports related information pertaining to the player. In various embodiments of the present invention, user module 118 enables access to players, coaches, selectors, referees/umpires, administrators and general users.

Data pertaining to one or more clubs is also provided to the users via system 100. Club module 120 enables access to data pertaining to the one or more clubs. Club module 120 also enables management of data pertaining to the clubs and the club members. In an embodiment of the present invention, club module 120 enables endorsement of clubs with one or more sports organizing committee's such as, but not limited to, IOA, Army and BCCI. Thereafter, the corresponding sports organizing committees can approve/reject the endorsement requests of clubs. Club module 120 also enables players to get affiliated and registered with the corresponding clubs and sports organizing committees. In another embodiment of the present invention, club module 120 enables players and coaches to view a list of endorsed clubs and thereafter associate themselves with one or more of the enlisted clubs. Subsequently, an authentication/acceptance is requested from the corresponding clubs.

In various embodiments of the present invention, access is provided to users on sports related information generated from collected data. Data record module 122 enables collection of data pertaining to sports via user interface 102. In an embodiment of the present invention, the data pertaining to sports is collected from authorized users. For example, a coach provides data pertaining to players, teams, performance of players in events and so forth. Alternately, data record module 122 enables collection of data pertaining to sports from web-based sources. In an embodiment of the present invention, prior to collection of data from web-based sources, data record module 122 enables seeking approval for collection of the corresponding data. For example, data record module 122 enables seeking approvals from coaches, referees/umpires etc. prior to collection of data pertaining to players.

Sports related information also includes data pertaining to one or more events such as Olympics, Asiad, Wimbledon and so forth. Event module 124 enables creation of one or more events via user interface 102. For creating an event, an authorized user provides details related to the event via user interface 102, wherein details related to the event include, but are not limited to, event name, event start date, event end date, data related to the sports that will be played in the event, participant categories that will be allowed (Junior/Senior level), nomination acceptance start date, nomination acceptance end date, identification of selectors, identification of referees, venue name and address etc.

In an embodiment of the present invention, event module 124 facilitates defining rules for events. Further, event module 124 enables prompting users via user interface 102 to define rules for sports for which there are no rules defined in repository 108.

Event module 124 also facilitates defining categories for the created events. Defining categories for the created events assists in capturing and tracking of details related to events. In addition, defining categories for the created events facilitates in defining access rights and privileges for various users associated with the corresponding events. In an embodiment of the present invention, defining categories facilitates associating events with auto-approval provisions, which assists automatic update of details related with event via web services. In an exemplary embodiment of the present invention, auto-approvals are provisioned for events categorized at BIG events such as, but not limited to, Olympics, Asiad and Common-Wealth games. The details associated with events may also be collected by using web services, which enables automatic update of details related to the events. The collection of event details may also be performed via predefined applications for such events such as predefined applications for Olympics, Asiad etc.

In various embodiments of the present invention, sports related information pertaining to players is provided via user interface 102 to authorized users. Player information module 126 enables access of sports related information pertaining to players. The corresponding information is generated from data collected via data record module 122, wherein the collected data is accessed from repository 108.

In an embodiment of the present invention, sports related information pertaining to players includes statistics of players, fitness level details of players and details related to competitors of players. The statistics of players is generated from data collected about players. Further, the statistics of players includes player career information, sports achievement information and so forth. Career information of a player includes information about sports events the player has participated in, performance of player in corresponding events, clubs the player has been associated with and so forth. Sports achievement information includes details about achievements of the player in various events that the player has participated in.

The fitness level details of players are generated from a predefined set of details gathered on fitness levels of players. The predefined set of details is gathered on a periodic basis from one of, but not limited to, coaches and web-based sources, wherein the time period for gathering the predefined set of details is one of, but not limited to, one day, one week, fifteen days, one game, one tournament and so forth. An example of predefined set of details gathered about players is illustrated in the following table:

| S. No. | Parameter Name | Identifier | Remarks |
| --- | --- | --- | --- |
| 1. | Concentration Level | $F_1$ | |
| 2. | Body Flexibility | $F_2$ | |
| 3. | Team Work Response | $F_3$ | Pertains to team games only |
| 4. | Stress and Strain | $F_4$ | |
| 5. | Exercise level Response | $F_5$ | |
| 6. | Medical Examination Score | $F_6$ | |
| 7. | Diet food acceptance level | $F_7$ | For estimating whether there is any deficiency in food/nutrients |
| 8. | Stamina level | $F_8$ | |
| ... n | | | |

In addition, the generation of fitness level details of players is based on the sports the players are associated with.

In an embodiment of the present invention, a fitness score is generated based on the gathered details. Further, the fitness score is updated based on the updates in the corresponding details. In various embodiments of the present invention, the fitness score is generated based on one or more predefined algorithms. In an exemplary embodiment of the present invention, the fitness score is calculated based on the following equation:

$$FS = \Sigma_{i=0}^{n} F_i / FLR;$$

wherein, FS represents the fitness score of the player, $F_i$ represents the value of fitness parameter i and FLR represents the Fitness Level Acceptance Range depicting the acceptable levels of fitness assigned by an authorized body such as a player selection committee, a sports organization and so forth.

Player information module 126 also provides each player details related to one or more competitors of the player. In an exemplary embodiment of the present invention, a player's skill level is assessed based on the statistics of the player. Thereafter, a set of players with similar skill levels are identified by comparing the statistics of players.

In various embodiments of the present invention, player information module 126 generates reports for depicting data pertaining to players. For example, player information module 126 generates reports related to performance of players. The reports for players are generated based on details gathered about the players. Examples of reports generated for players include performance reports depicting performance of players in sports events, reports depicting career information of players, fitness level reports of players and so forth. Thereafter, the generated reports are stored in repository 108 and can be subsequently accessed via user interface 102. In an exemplary embodiment of the present invention, the generated reports include a tabular and/or graphical representation of details. For example, player information module 126 generates charts depicting a player's performance in last 4 events, fitness for player in last 5 events and so forth.

System 100 enables generating recommendations about one or more users. For example, system 100 enables generating recommendations about top performing players. System 100 enables generation of recommendations via recommendation module 128. In an embodiment of the present invention, the recommendations are generated by calculating scores based on details gathered about players. An example of details gathered about players is illustrated in the following table:

| S. No | Factor Name(s) | Factor Description | Factor(or Weighted average) | Data Source | Algorithm |
|---|---|---|---|---|---|
| 1. | Curr_season_rec | Current Season record | 20.5 | Player | Summation of records in games played in the current season. |
| 2 | Career_rec | Player's career record | 10 | Player | Summation of records in all the games played by the player. |
| 3 | Fitness_score | Player's current fitness score | 24.5 | Fitness Levels gathered | Fitness score calculated based on $FS = \Sigma_{i=0}^{n} F/FLR$ |
| ... x | | | | | |

Further, recommendation module 128 calculates a recommendation score based on the gathered details. In an embodiment of the present invention, the recommendation score for each player is calculated by taking a weighted average of the identified factors.

In an exemplary embodiment of the present invention, the recommendation score for each player is calculated based on the following equation:

$$ReP = (W_1S_1 + W_2S_2 + W_3S_3 + W_4S_4 + W_5S_5 + W_6S_6 + \ldots W_iS_i + \ldots W_xS_x)/100;$$

wherein, ReP represents the recommendation percentage for each player, $W_i$ represents the weight assigned to the factor i, $S_i$ represents the score calculated for factor i and x represents the total number of factors. After calculating the ReP for each player, the ReP values are sorted.

Subsequently, a recommendation of top performing players is made based on the sorted ReP values. Information pertaining to the top performing players is gathered and presented in a report, which is rendered to authorized users via user interface 102.

Sports module 112 includes selection module 130 that facilitates in the selection of players and coaches. In an embodiment of the present invention, selection module 130 enables search of players from a pool of players available based on a search input. The search input can be one of, but not limited to, sport name, achievements, player level, experience, fitness level and so forth. A list of players is returned based on the search input provided. One or more selectors can access selection module 130 for selecting players by identifying players based on relevant search inputs.

In another embodiment of the present invention, selection module 130 enables selection of coaches. Players can select coaches from a list of available coaches via user interface 102. Thereafter, the corresponding coaches are provided with the list of players that have selected them. Accordingly, the coaches can select/approve/reject players from the list of players.

Sports module 112 includes web services module 132 that enables provisioning of one or more web-based services to the users. In an embodiment of the present invention, the one or more web services include web services to fetch rating/index for various sports/games provided by third parties such as, but not limited to, FIFA and ICC. In another embodiment of the present invention, the one or more web services include web services for fetching advertisements from currently endorsed advertiser's. In another embodiment of the present invention, the one or more web services include web services for providing up-to-date medicine and diet information pertaining to various sports. The users can access the corresponding information via user interface 102.

In various embodiments of the present invention, web services module 132 interacts with web module 110 for providing the web services. Web module 110 interacts with web service providers for gathering details pertaining to the one or more web services.

Sports module 112 also enables users to access virtual play options such as virtual tournaments, super selectors and so forth rendered via user interface 102 via virtual play module 134. The virtual play option enables users to access player statistics and event rules and accordingly form/define a virtual player/team to participate in the corresponding event. The virtual play option also enables allocation of reward points based on the success or failure of the virtual player/team.

Sports module 112 includes validation module 136 for providing business validation based on one or more business validation strategies. For example, validation module 136 validates whether a player has not registered in an event before enabling registration of the player with the event. In another example, validation module 136 validates the availability of time slots before allocation of time schedules to events.

Sports module 112 includes workflow module 138 for defining and managing one or more workflows. Further, workflow module 138 enables control and execution of defined workflows. In an embodiment of the present invention, workflow module 138 includes a workflow engine for defining and managing one or more workflows. Workflow module 138 defines the steps and the sequence of steps of workflows, which depict the association and connection of the methods/activities, for which the workflows are defined. Examples of workflows that can be defined include, but are not limited to, record update workflow, identifying competitor workflow, player verification and selection workflow, creation of event workflow, performance feedback workflow and registration and initial data workflow.

Figure 1B:
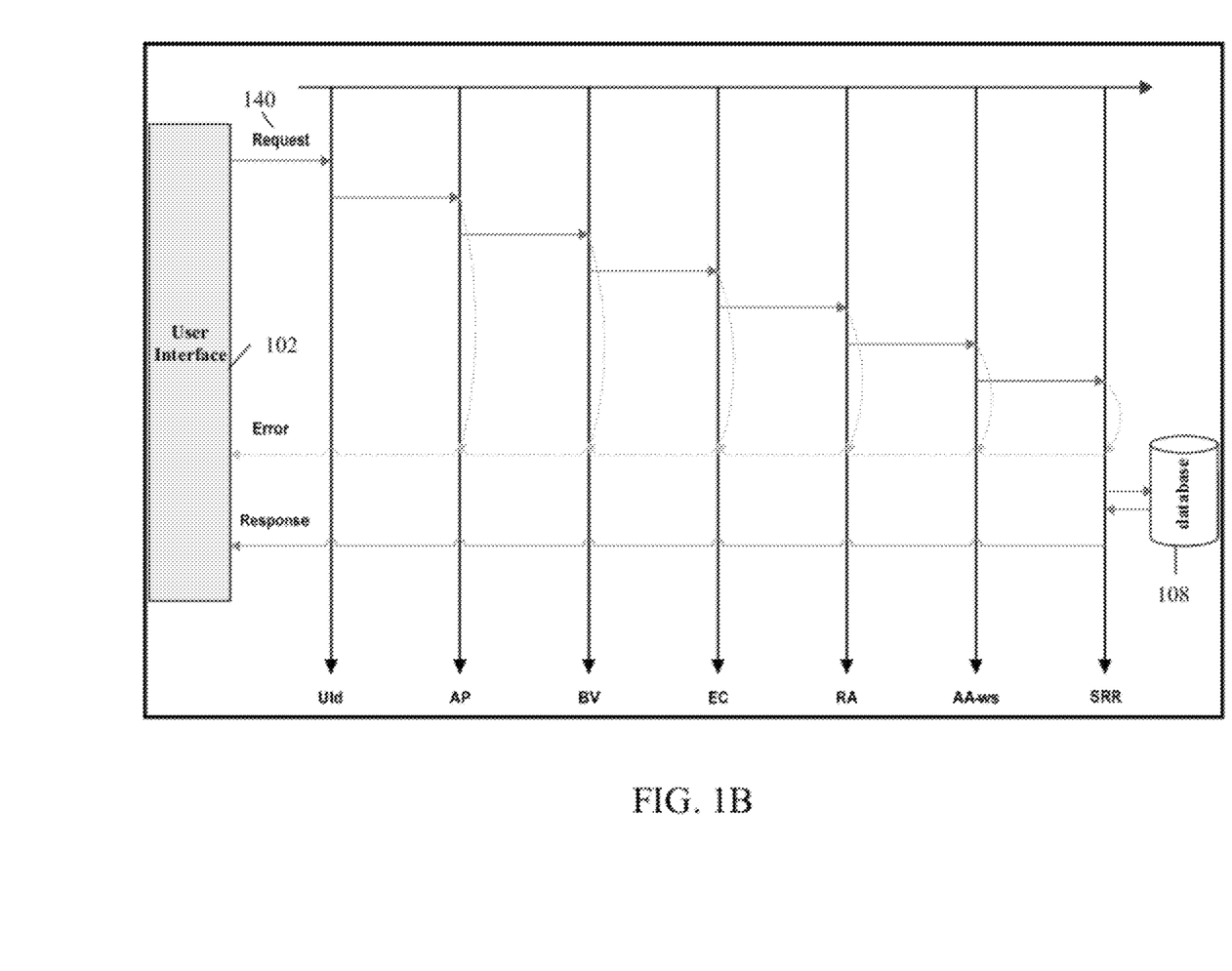
FIG. 1B illustrates an exemplary workflow for updating sports related information.

FIG. 1B illustrates an exemplary workflow for updating sports related information. As illustrated, a request 140 is made by a user for updating a player/team record via user interface 102. Request 140 includes player/team name, event name, referee/approver name and so forth, i.e. request 140 includes data required for updating information in repository 108. Thereafter, based on request 140 the user is authenticated and access is provided based on access rights and privileges (AP) defined for the user. Post authentication validation module 136 (FIG. 1A) checks for any violation of business rules (BV). For example, if a referee for an event A is logged in, the referee should not be able to send updates related to records of event B and so forth. Further, event module 124 (FIG. 1A) checks the category of the event (EC) and accordingly forwards requests for approvals (RA) or auto-approvals (AA-ws). Subsequently, the rules defined for the corresponding sports (SRR) are accessed from repository 108 and the updates received are verified based on the accessed rules for persistence. Thereafter, the details are updated.

Figure 2A:
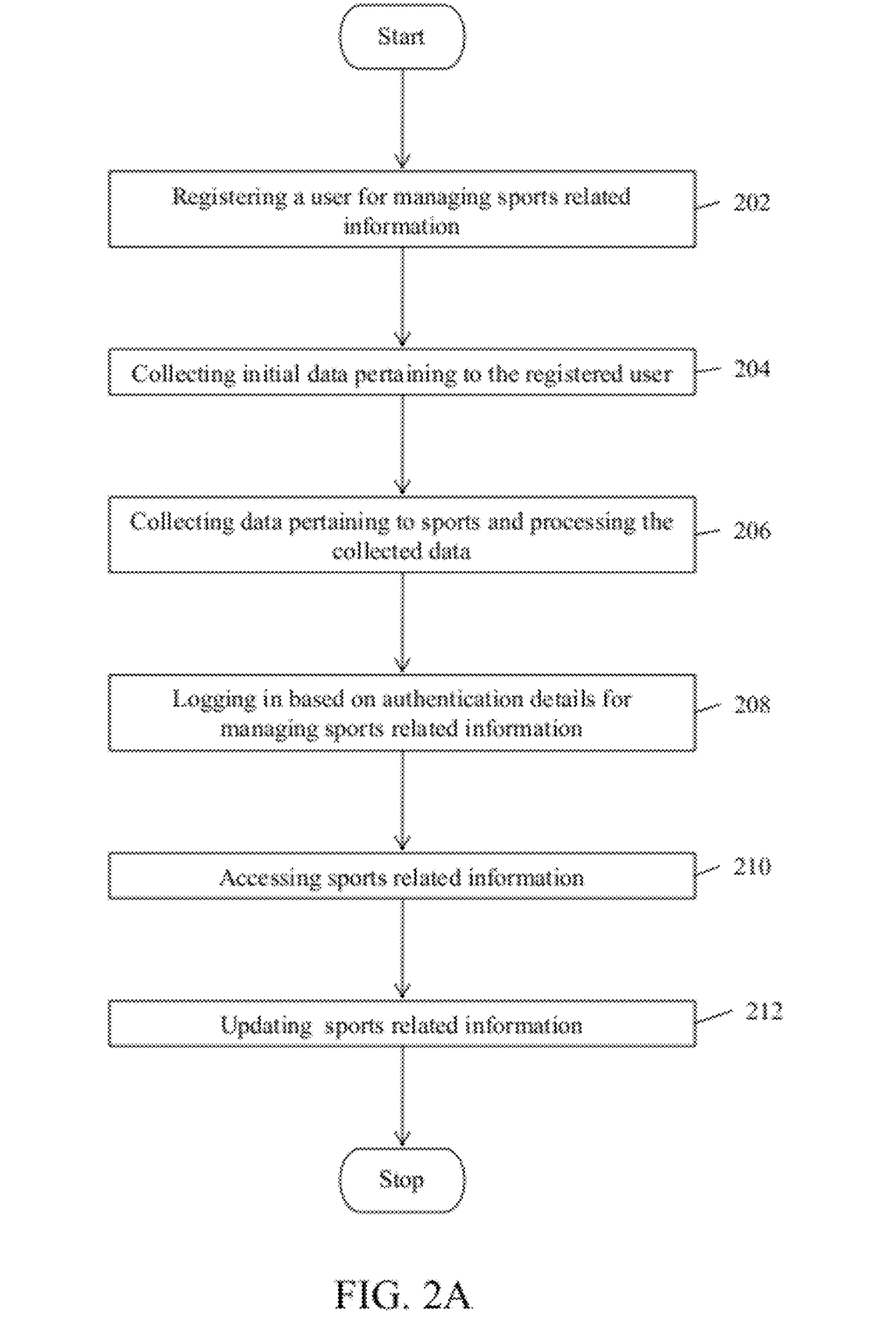
FIG. 2A illustrates a flowchart of a method for managing sports related information, in accordance with an embodiment of the present invention.

FIG. 2A illustrates a flowchart of a method for managing sports related information, in accordance with an embodiment of the present invention.

At step 202, a user is registered for management of sports related information. In an embodiment of the present invention, the registration is performed via a registration interface. Registration of the user includes collection of a predefined set of details relating to the user, validation and verification of the collected details and generation of a unique identifier (UId). The validation of the collected details is performed to check consistency in the collected details. If the captured details are consistent, the captured details are forwarded for verification. If the captured details are not consistent, the user is prompted to re-enter the details that are not consistent and the details captured thereafter are validated and forwarded for verification.

At step 204, initial data pertaining to users is collected. In an embodiment of the present invention, the initial data is collected from a user interface and stored in a repository. Subsequent to registration of users, initial data includes details such as career information of the user, sports achievements of the user, clubs the user is associated with and so forth.

At step 206, data pertaining to sports is collected and processed to generate sports related information. In an embodiment of the present invention, the data is collected from the user interface and stored in the repository. Data pertaining to sports includes data related to one or more of, but not limited, users, sports, sport events, sports organizations and sports related news/media/advertisements.

The processing of collected data to generate sports related information includes one or more of, but not limited to, validating collected data, gathering approvals pertaining to collected data and generating reports from collected data. In an embodiment of the present invention, the processing of collected data is performed via one or more predefined algorithms. Thereafter, the processed data is stored in the repository.

At step 208, a registered user logs in for managing sports related information. In an embodiment of the present invention, the user logs in by accessing a user login interface. In order to log in the registered user is prompted to provide login and password details.

At step 210, the sports related information is accessed. In various embodiments of the present invention, sports related information is accessed via the user interface. The access is enabled after authentication of users. Subsequent to authentication of the provided login and password details, sports related information corresponding to the registered user based on the UId of the registered user is rendered. For example, after logging in a player can view latest achievements, upcoming events, events in which the player is participating, personal profile and records, various sports related news, possible competitors, advertisements, new rules and regulations and so forth.

In another example, a coach after authentication can view news related to latest events, his player's/team's performance, records and various statistics of individual players, top performing players, fitness levels of players in current season, medicine and diet information and so forth.

In another example, selectors, club managers, team administrators and so forth can view information related to coaches and players who are registered under them, performance of the corresponding coaches and players, consolidated data of players that may facilitate in selecting best players out of the pool of players and so forth. Examples of selectors include members of Indian Olympic Association (IOA), Sports Authority of India (SAI) and so forth.

In another example, referees/umpires can view team/player performance information in events they have supervised, updates in rules and regulations and so forth.

In another example, administrators can view confidential information like total revenue generated, total expenses incurred, cost of particular event, cost and expenses over each player, financial statistics and so forth, wherein administrators are one of sports organization members who are administrators of the system for managing sports related information such as, members of International Olympic Committee (IOC), Indian Olympic Association (IOA), Indian Government Sports Authorities, Army, Sports Authority of India (SAI), State Government authorities who organize events at their level for their benefits or recreational and so forth.

Figure 2B:
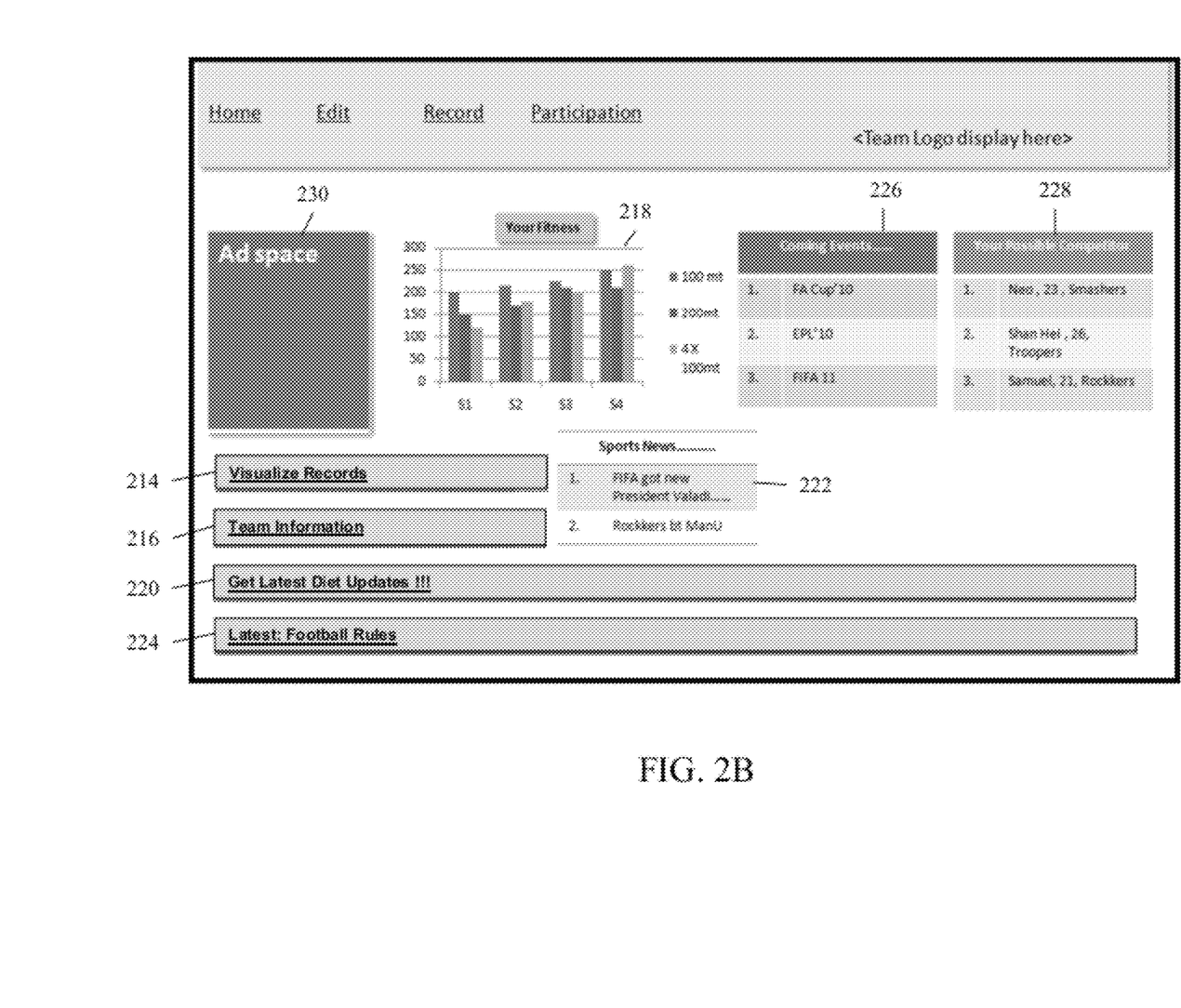
FIG. 2B illustrates an exemplary screenshot of a user interface rendered to players.

FIG. 2B illustrates an exemplary screenshot of a user interface rendered to players. As illustrated, a player can access a set of options to view corresponding sports related information. The set of options includes, but is not limited to, options to view records, team information, fitness levels, diet information, news, rules, events, competitors, advertisements and so forth. Further, the corresponding options can be viewed/accessed by accessing a records tab 214, a team information tab 216, a fitness level section 218, a diet information tab 220, a news section 222, a rule tab 224, an event section 226, a competitor section 228 and an advertisement section 230.

Figure 2C:
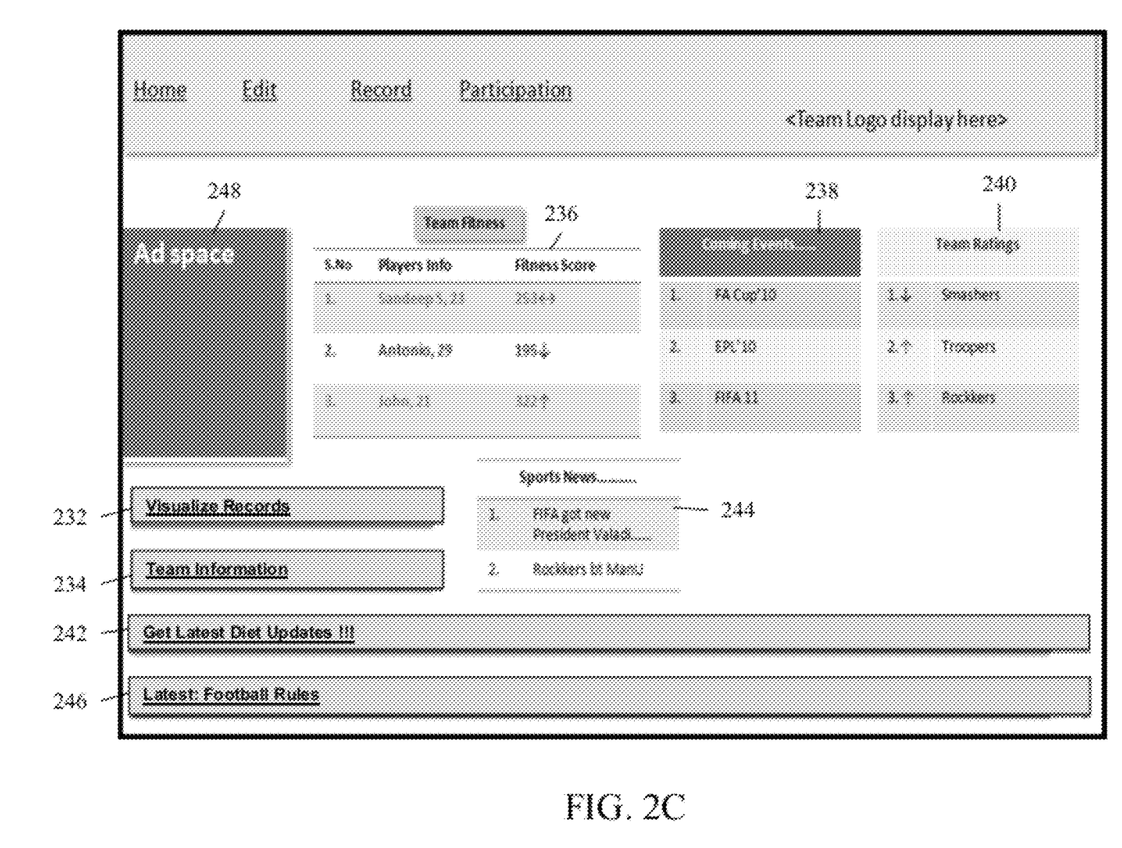
FIG. 2C illustrates an exemplary screenshot of a user interface rendered to coaches.

FIG. 2C illustrates an exemplary screenshot of a user interface rendered to coaches. As illustrated, a coach can access a set of options to view corresponding sports related information. The set of options includes, but is not limited to, options to view records, team information, team fitness levels, team ratings, diet information, news, rules, events, competitors, advertisements and so forth. Further, the corresponding options can be viewed/accessed by accessing a records tab 232, a team information tab 234, a team fitness level section 236, an event section 238, a team ratings section 240, a diet information tab 242, a news section 244, a rule tab 246 and an advertisement section 248.

As illustrated for players and coaches, various users such as referees/umpires, selectors and so forth can access corresponding sports related information via the rendered interfaces.

At step 212, the sports related information is updated. In an embodiment of the present invention, sports related information is updated via the user interface. For example, a referee can update player/team performance information upon completion of an event via the user interface.

In various embodiments of the present invention, sports related information is updated based on feeds/inputs collected from users and web-based sources. Further, updating includes at least one of modifying existing sports related information and appending existing sports related information. Appending may comprise adding information related to updates in various sports. For example, information associated with a player is updated based on data collected about performance of the player in a sport event such as Olympics, Asiad etc.

Various embodiments of the present invention, may be implemented via one or more computer systems. The computer system includes at least one processing unit and memory. The processing unit executes program instructions and may be a real or a virtual processor. The computer system is not intended to suggest any limitation as to scope of use or functionality of described embodiments. Typical examples of a computer system include a general-purpose computer, a programmed microprocessor, a micro-controller, a peripheral integrated circuit element, and other devices or arrangements of devices that are capable of implementing the steps that constitute the method of the present invention. In an embodiment of the present invention, the memory may store software for implementing various embodiments of the present invention.

The present invention may suitably be embodied as a computer program product for use with a computer system. The method described herein is typically implemented as a computer program product, comprising a set of program instructions which is executed by a computer system or similar device. The set of program instructions may be a series of computer readable codes stored on a tangible medium, such as a computer readable storage medium, for example, diskette, CD-ROM, ROM, or hard disk, or transmittable to a computer system, via a modem or other interface device, over either a tangible medium, including but not limited to optical or analogue communications lines. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various changes in form and detail may be made therein without departing from or offending the spirit and scope of the invention.

What is claimed is:

1. A non-transitory computer readable medium having computer-readable program code comprising instructions that executed by a computer system, cause the computer system to:
   a) prompt a player user to input a predefined set of details;
   b) receive data from the player user, the received data comprising:
      player user performance data comprising the player user's sport related performance and sport related career information; and
   c) process the received data to generate sports related information of the player user using predetermined algorithms, the generated information accessed by authorized users, the processing comprising:
      i) validating the received data by checking consistency and validating the generated information based on one or more business validation strategies;
      ii) registering the player user, subject to prior confirmation of veracity of the player user performance data input by the player user;
      iii) calculating a fitness score for the player user, wherein calculating the fitness score comprises summing a plurality of ratios between values of fitness parameters and respective assigned acceptable levels of fitness for the fitness parameters, wherein the fitness parameters comprise one or more selected from the group consisting of concentration level, body flexibility, team work response, stress and strain, exercise level response, medical examination score, diet food acceptance level, and stamina level;
      iv) providing player user performance data collected from player users to users in response to requesting information of the player user by the player users, wherein providing the player user performance data comprises displaying the calculated fitness score for a plurality of events or sports and the player user performance data comprises the calculated fitness score;
      v) calculating a recommendation score for one or more player users based on a plurality of factors and respective weights for the factors by predetermined algorithms, wherein the factors comprise the fitness score;
      vi) generating recommendations relating to the one or more player users, wherein a recommendation relating to a specific player user is based on the player user performance data received from the specific player user; and
      vii) accepting selection from the recommendations of the one or more player users.

2. The non-transitory computer readable medium of claim 1 further comprising instructions that executed by the computer system, cause the computer system to:
   register one or more users by receiving a predetermined set of details.

3. The non-transitory computer readable medium of claim 1 further comprising instructions that executed by the computer system, cause the computer system to:
   provision one or more predetermined web-based services to authorized users.

4. The non-transitory computer readable medium of claim 1 further comprising instructions that executed by the computer system, cause the computer system to:
   provide at least one virtual play option to authorized users, wherein the virtual play option performs:
   access player statistics and event rules and accordingly define a virtual player or team to participate in a corresponding event; and
   allocate reward points based on success or failure of the virtual player or team.

5. The non-transitory computer readable medium of claim 1 further comprising instructions that executed by the computer system, cause the computer system to:
   create an event comprising event details, wherein the event details comprise an event name, event start date, event end date, and venue name;
   define a plurality of event categories, wherein the event categories define access rights and privileges for users associated with corresponding events;

wherein automatic approvals are provisioned for the event based on being categorized as a particular event category of the event categories.

6. The non-transitory computer readable medium of claim 5 further comprising instructions that executed by the computer system, cause the computer system to:
based on the automatic approvals, perform automatic update of the event details via web services.

7. The non-transitory computer readable medium of claim 6 further comprising instructions that executed by the computer system, cause the computer system to:
with the web services, fetch content from an endorsed content provider.

8. The non-transitory computer readable medium of claim 1 further comprising instructions that executed by the computer system, cause the computer system to:
identify a set of players with similar skill levels to the player user as competitors of the player user; and
display the set of players as competitors in a user interface accessed by the player user.

9. The non-transitory computer readable medium of claim 1 wherein:
the fitness parameters comprise concentration level, body flexibility, team work response, stress and strain, exercise level response, medical examination score, diet food acceptance level, and stamina level.

10. A method comprising:
a) prompting, by a computer, a player user to input a predefined set of details;
b) receiving data from the player user, the received data comprising:
player user performance data comprising the player user's sport related performance and sport related career information; and
c) processing the received data to generate sports related information of the player user using predetermined algorithms, the generated information accessed by authorized users, the processing comprising:
i) validating the received data by checking consistency and validating the generated sports related information based on one or more business validation strategies;
ii) registering the player user, subject to prior confirmation of veracity of the player user performance data input by the player user;
iii) calculating a fitness score for the player user, wherein calculating the fitness score comprises summing a plurality of ratios between values of fitness parameters and respective assigned acceptable levels of fitness for the fitness parameters, wherein the fitness parameters comprise one or more selected from the group consisting of concentration level, body flexibility, team work response, stress and strain, exercise level response, medical examination score, diet food acceptance level, and stamina level;
iv) providing player user performance data collected from player users to users in response to requesting information of the player user by the player users, wherein providing the player user performance data comprises displaying the calculated fitness score for a plurality of events or sports and the player user performance data comprises the calculated fitness score;
v) calculating a recommendation score for one or more player users based on a plurality of factors and respective weights for the factors by predetermined algorithms, wherein the factors comprise the fitness score;
vi) generating recommendations relating to the one or more player users, wherein a recommendation relating to a specific player user is based on the player user performance data received from the specific player user; and
vii) accepting selection from the recommendations of the one or more player users.

11. The method of claim 10 further comprising:
registering one or more users by receiving a predetermined set of details.

12. The method of claim 10 further comprising:
provisioning one or more predetermined web-based services to authorized users.

13. The method of claim 10 further comprising:
providing at least one virtual play option to authorized users, wherein the virtual play option performs:
accessing player statistics and event rules and accordingly define a virtual player or team to participate in a corresponding event; and
allocating reward points based on success or failure of the virtual player or team.

14. The method of claim 10 further comprising:
creating an event comprising event details, wherein the event details comprise an event name, event start date, event end date, and venue name; and
defining a plurality of event categories, wherein the event categories define access rights and privileges for users associated with corresponding events;
wherein automatic approvals are provisioned for the event based on being categorized as a particular event category of the event categories.

15. The method of claim 14 further comprising:
based on the automatic approvals, performing automatic update of the event details via web services.

16. The method of claim 15 further comprising:
with the web services, fetching content from an endorsed content provider.

17. The method of claim 10 further comprising:
identifying a set of players with similar skill levels to the player user as competitors of the player user; and
displaying the set of players as competitors in a user interface accessed by the player user.

18. A system comprising:
memory;
at least one processing unit;
wherein the memory comprises computer-readable program code comprising instructions that executed by a computer system, cause the computer system to:
a) prompt a player user to input a predefined set of details;
b) receive data from the player user, the received data comprising:
player user performance data comprising the player user's sport related performance and sport related career information; and
c) process the received data to generate sports related information of the player user using predetermined algorithms, the generated information accessed by authorized users, the processing comprising:
i) validating the received data by checking consistency and validating the generated sports related information based on one or more business validation strategies;

ii) registering the player user, subject to prior confirmation of veracity of the player user performance data input by the player user;

iii) calculating a fitness score for the player user, wherein calculating the fitness score comprises summing a plurality of ratios between values of fitness parameters and respective assigned acceptable levels of fitness for the fitness parameters, wherein the fitness parameters comprise one or more selected from the group consisting of concentration level, body flexibility, team work response, stress and strain, exercise level response, medical examination score, diet food acceptance level, and stamina level;

iv) providing player user performance data collected from player users to users in response to requesting information of the player user by the player users, wherein providing the player user performance data comprises displaying the calculated fitness score for a plurality of events or sports and the player user performance data comprises the calculated fitness score;

v) calculating a recommendation score for one or more player users based on a plurality of factors and respective weights for the factors by predetermined algorithms, wherein the factors comprise the fitness score;

vi) generating recommendations relating to the one or more player users, wherein a recommendation relating to a specific player user is based on the player user performance data received from the specific player user; and vii) accepting selection from the recommendations of the one or more player users.

\* \* \* \* \*